United States Patent
Rylski et al.

(10) Patent No.: US 9,618,225 B2
(45) Date of Patent: *Apr. 11, 2017

(54) BATTERY POWER MANAGEMENT IN A THERMOSTAT WITH A WIRELESS TRANSCEIVER

(71) Applicant: Emerson Electric Co., St. Louis, MO (US)

(72) Inventors: Erik O. Rylski, Clayton, MO (US); William P. Butler, Crestwood, MO (US)

(73) Assignee: Emerson Electric Co., St. Louis, MO (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/835,765

(22) Filed: Aug. 26, 2015

(65) Prior Publication Data

US 2015/0369506 A1    Dec. 24, 2015

Related U.S. Application Data

(63) Continuation of application No. 13/866,118, filed on Apr. 19, 2013, now Pat. No. 9,122,283.

(51) Int. Cl.
*G05D 23/19* (2006.01)
*F24F 11/00* (2006.01)
*H02J 7/00* (2006.01)

(52) U.S. Cl.
CPC ......... *F24F 11/006* (2013.01); *F24F 11/001* (2013.01); *F24F 11/0086* (2013.01); *G05D 23/1905* (2013.01); *F24F 2011/0047* (2013.01); *F24F 2011/0068* (2013.01); *F24F 2011/0073* (2013.01); *F24F 2011/0091* (2013.01); *G05D 23/1919* (2013.01); *H02J 7/0021* (2013.01); *H02J 7/0047* (2013.01)

(58) Field of Classification Search
CPC .............. G05D 23/19; G05D 23/1919; G05D 23/1905; H02J 7/0021; H02J 7/0047
See application file for complete search history.

(56) References Cited

U.S. PATENT DOCUMENTS

| | | | |
|---|---|---|---|
| 5,224,648 A | 7/1993 | Simon et al. | |
| 6,315,211 B1 | 11/2001 | Sartain et al. | |
| 6,622,925 B2 | 9/2003 | Carner et al. | |
| 7,058,477 B1 | 6/2006 | Rosen | |
| 7,537,171 B2 | 5/2009 | Mueller et al. | |
| 8,639,387 B2 | 1/2014 | Byberg et al. | |
| 9,122,283 B2 * | 9/2015 | Rylski | G05D 23/1905 |

(Continued)

OTHER PUBLICATIONS

Canadian Office Action dated May 11, 2015, issued in co-pending Canadian Application No. 2,848,845 which has the same priority as the instant application, 4 pgs.

*Primary Examiner* — Ljiljana Ciric
*Assistant Examiner* — Alexis Cox
(74) *Attorney, Agent, or Firm* — Harness, Dickey & Pierce, P.L.C.

(57) ABSTRACT

A thermostat includes a controller for controlling the thermostat, a battery supplying power for the thermostat, and a wireless transceiver for receiving control information from a remote device and for transmitting information to the remote device. The controller sets a default time schedule for enabling the wireless transceiver.

19 Claims, 7 Drawing Sheets

(56) References Cited

U.S. PATENT DOCUMENTS

| | | | |
|---|---|---|---|
| 2001/0048030 A1* | 12/2001 | Sharood | G05B 19/00 236/49.3 |
| 2006/0100002 A1 | 5/2006 | Luebke et al. | |
| 2006/0186214 A1 | 8/2006 | Simon et al. | |
| 2007/0012052 A1 | 1/2007 | Butler et al. | |
| 2007/0040040 A1 | 2/2007 | Mueller | |
| 2007/0114295 A1 | 5/2007 | Jenkins | |
| 2007/0241203 A1 | 10/2007 | Wagner et al. | |
| 2007/0290924 A1* | 12/2007 | McCoy | G06Q 10/087 342/464 |
| 2008/0089277 A1 | 4/2008 | Alexander et al. | |
| 2009/0207824 A1 | 8/2009 | Lee et al. | |
| 2009/0240377 A1* | 9/2009 | Batzler | G05B 23/0216 700/287 |
| 2010/0271252 A1* | 10/2010 | Musschebroeck | G08C 17/02 341/176 |
| 2010/0276482 A1 | 11/2010 | Raihi et al. | |
| 2011/0061014 A1 | 3/2011 | Frader-Thompson et al. | |
| 2011/0063126 A1 | 3/2011 | Kennedy et al. | |
| 2012/0248211 A1 | 10/2012 | Warren et al. | |
| 2012/0256009 A1 | 10/2012 | Mucignat et al. | |
| 2014/0312127 A1 | 10/2014 | Rylski et al. | |
| 2014/0330438 A1 | 11/2014 | Haines et al. | |
| 2015/0115045 A1 | 4/2015 | Tu et al. | |
| 2015/0148965 A1* | 5/2015 | Lemire | G05B 15/02 700/276 |
| 2016/0334812 A1* | 11/2016 | Zikes | G05D 23/1919 |

* cited by examiner

BATTERY POWER MANAGEMENT IN A THERMOSTAT WITH A WIRELESS TRANSCEIVER

CROSS-REFERENCE TO RELATED APPLICATION

This application is a continuation of U.S. patent application Ser. No. 13/866,118 filed Apr. 19, 2013. The entire disclosure of the above application is incorporated herein by reference.

FIELD

The present disclosure relates to battery power management in a thermostat with a wireless transceiver. More specifically (but not exclusively), the present disclosure relates to setting a time schedule for enabling the wireless transceiver in a thermostat.

BACKGROUND

This section provides background information related to the present disclosure which is not necessarily prior art.

It is known to connect thermostats to wireless transceivers for receiving and transmitting information to and from remote devices. Known thermostats with wireless transceivers may be powered via continuous or essentially continuous power. Such continuous power is typically from a common or neutral connector (often referred to as a C connection or wire) or from power stealing. Power stealing is a known technique where power for the thermostat is drawn from or "stolen" from the connections to the heating transformer or the cooling transformer, when such transformers are not connected to a load. Power stealing essentially derives power from a transformer at a current level low enough to prevent the load from being engaged. In such continuous power systems, there is always or almost always sufficient power available that a wireless transceiver is continuously enabled or powered to continuously communicate with remote devices and respond to commands from those remote devices.

It is also known for thermostats that draw power from power sources external to the thermostat to include a power supply internal to the thermostat, such as batteries, when external power is not available. The battery supply may also include additional power backup, such as a capacitor, to maintain power when both the external and internal power are unavailable. In such thermostats, it is also known to provide for reduction of energy consumption when the thermostat relies solely on a battery supply and to provide the user with a notice that the battery energy level is low. These thermostats, however, typically become fully operative when a user engages a user interface (e.g., touch screen, switch, button, etc.) and thus, the thermostat effectively is always available to the user to control heating and cooling. If an internally powered thermostat with a wireless transceiver is to always be available to a user, the internal power supply life will likely be unacceptably short, perhaps only several days.

SUMMARY

This section provides a general summary of the disclosure, and is not a comprehensive disclosure of its full scope or all of its features.

Examples are disclosed of a thermostat that includes a controller for controlling the thermostat, a power supply sensor connected to the controller for sensing a thermostat power source, and a wireless transceiver connected to the controller for receiving control information from a remote device and for transmitting information to the remote device. The controller sets a time schedule for enabling the wireless transceiver when the power supply sensor detects that the thermostat power source is a battery.

Examples are also disclosed of a thermostat that includes a controller for controlling the thermostat, a battery supplying power for the thermostat and connected to the controller, and a wireless transceiver connected to the controller for receiving control information from a remote device and for transmitting information to the remote device. The controller sets a default time schedule for enabling the wireless transceiver.

Examples are also disclosed of a thermostat system including a remote device for sending control information to a thermostat and for receiving information from the thermostat, a controller for controlling the thermostat, a battery supplying power for the thermostat and connected to the controller, and a wireless transceiver connected to the controller for receiving the control information from the remote device and for transmitting information to the remote device. The controller sets a default time schedule for enabling the wireless transceiver.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

As noted above in the background, known thermostats with wireless transceivers may be powered via continuous or essentially continuous power. Such continuous power is typically from a common or neutral connector (often referred to as a C connection or wire) or from power stealing. But not all systems have a C wire connection, and it would be an added expense and effort to install such a connection. Similarly, not all systems are compatible with a power stealing circuit. Therefore, there is still a need for an internal battery powered thermostat. It would be desirable to provide a battery powered thermostat with a wireless transceiver that manages the battery power to prolong a useful life of the battery compared to a battery powered thermostat that continuously enabled its wireless transceiver. Accordingly, exemplary embodiments are disclosed herein that relate to battery power management in a thermostat with a wireless transceiver, such as by setting a time schedule for enabling the wireless transceiver in a thermostat.

Figure 1:
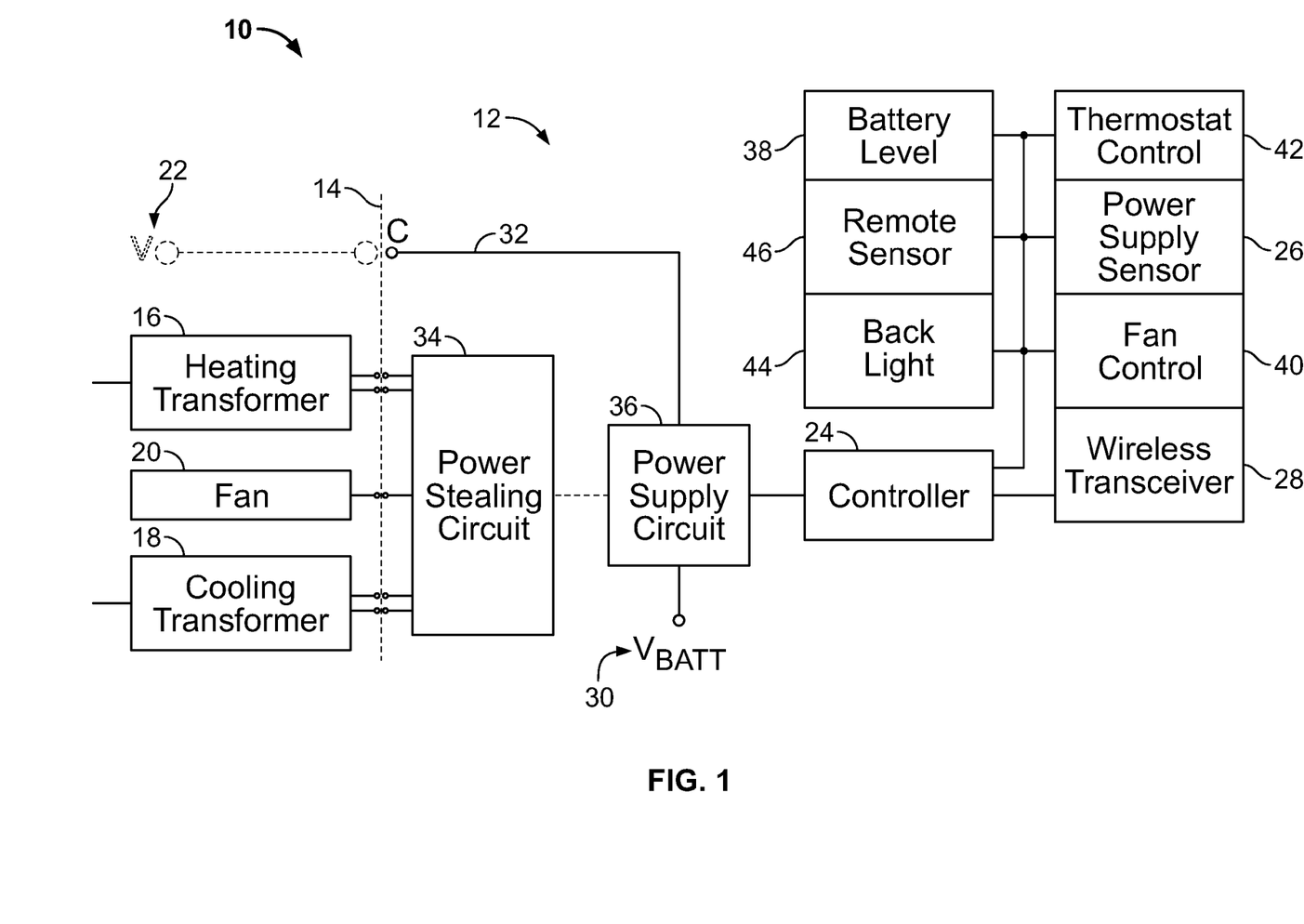
FIG. 1 is a block diagram of an example climate control system with an example thermostat in accordance with the present disclosure.

FIG. 1 shows a climate control system 10 with a thermostat 12, to the right of dashed line 14, connected to a heating transformer 16, a cooling transformer 18, and a fan 20, to the left of line 14. The transformers 16, 18 and fan 20 are a part of a typical climate control system and are connected to components (not shown), such as an air conditioner compressor and a furnace gas valve. A common or neutral C connection may or may not be present as indicated by the dashed line and dashed V, shown generally at 22.

In some examples, such as FIG. 1, the thermostat 12 includes a controller 24 for controlling the thermostat 12, a power supply sensor 26 connected to the controller 24 for sensing a thermostat power source (30, 32, or 34), and a wireless transceiver 28 connected to the controller 24 for receiving control information from a remote device (described below) and for transmitting information to the remote device. In operation, the controller 24 sets a time schedule for enabling the wireless transceiver 28 when the power supply sensor 26 detects that the thermostat power source is a battery 30.

The power supply sensor 26 may determine whether the power supplied to the thermostat 12 is at least one of continuous power, power stealing power, and battery power. Continuous power is supplied to power supply circuit 36 by common C connection 32, if such connection is available. Power stealing power may be supplied to power supply circuit 36 by power stealing circuit 34, if C connection 32 is not available and the transformers 16, 18 are compatible with power stealing circuit 34. Finally, battery power 30 may be supplied to power supply circuit 36, if and when C connection 32 and power stealing circuit 34 are unavailable. When continuous power or power stealing power is detected, the controller 24 may enable the wireless transceiver 28 to continuously receive information from the remote device and transmit information to the remote device. In some example embodiments, information may be displayed on the remote device indicating that the wireless transceiver 28 is continuously enabled.

The thermostat 12 may also include a battery level indicator 38 for determining a remaining power capacity of the battery 30. The time schedule may be changed, e.g., automatically by the controller 24, to increase a time period between when the wireless transceiver 28 is enabled as the remaining power capacity of the battery 30 decreases (described in more detail below).

The time schedule may also be programmable by a user, as described below.

The time schedule may also be transmitted to the remote device and displayed on the remote device. The time schedule may be displayed on the remote device as a time remaining to when the wireless transceiver is enabled. Said another way, the time schedule may be displayed as a time remaining to the next synchronization (sync) event.

The remaining power capacity of the battery 30 may be transmitted to the remote device and displayed on the remote device. The power capacity may be displayed in any appropriate manner such as in text or as a battery icon with power level sections or other graphical representations such as a bar, a pie-chart, or a fuel level gauge.

The thermostat 12 may also include other components or circuits connected to the controller 24, beyond those outlined above. Some other components may include a fan control 40, thermostat or temperature control 42, a back light 44, and a remote sensor 46. Remote sensor 46 may sense a remote control (not shown) other than the remote device referred to above. For instance, the remote sensor 46 may respond to a whole house remote control system, or a dedicated remote control for the thermostat. Remote sensor 46 may sense control signals other than radio signals, such as infrared, sound, voice, light, or other signals. Remote sensor 46 may not sense radio signals because wireless transceiver 28 serves that purpose. Though, if thermostat 12 is capable of receiving multiple types or frequencies of radio signals, it may be appropriate for remote sensor 46 to also be a radio transceiver. For example, wireless transceiver 28 may be for receiving and transmitting Wi-Fi 802.11 formatted signals, cellular phone signals, or the like and remote sensor may be for receiving and transmitting ZigBee® formatted signals.

Another example includes thermostat 12, as described above, but without common C connection 32 and without power stealing circuit 34. In this example thermostat 12 only includes battery 30 connected to power supply circuit 36. The thermostat 12 includes a controller 24 for controlling the thermostat 12, a battery 30 supplying power for the thermostat 12 and connected to the controller 24, a wireless transceiver 28 connected to the controller 24 for receiving control information from a remote device and for transmitting information to the remote device, and where the controller 24 sets a default time schedule for enabling the wireless transceiver 28. The thermostat 12 with battery only power may also include the other capabilities described above.

Still another example is a thermostat system including a remote device for sending control information to a thermostat 12 and for receiving information from the thermostat 12, a controller 24 for controlling the thermostat 12, a battery 30 supplying power for the thermostat 12 and connected to the controller 24, a wireless transceiver 28 connected to the controller 24 for receiving the control information from the remote device and for transmitting information to the remote device, and where the controller 24 sets a default time schedule for enabling the wireless transceiver 28.

FIGS. 2-6 show a display 48 of thermostat 12. Display 48 includes the time schedule described above displayed as a time to the next synchronization. In this example, the time schedule is displayed as "NEXT SYNC IN 15 MIN.", shown generally at 50. The display 48 may also include an icon of a radio signal, such as shown at 52. The display 48 may further include an indication of the power capacity of the battery 30, such as the icon 54. The icon 54 shows the battery as fully charged.

The battery power dependent thermostat 12 of FIGS. 2-6 is programmed to power up the wireless transceiver or radio 28 according to a predetermined time schedule of every 15 minutes. The time schedule could be some time other than 15 minute intervals between enabling the wireless transceiver 28. The time intervals could be less than or greater than 15 minutes. The shorter the time period between when the wireless transceiver is enabled the more battery power capacity will be consumed, requiring the battery 30 to be replaced sooner. The shorter the time period between when the wireless transceiver is enabled the more often information will be transferred between the thermostat 12 and the remote device. A longer time period between when the wireless transceiver is enabled results in longer battery life but allows the thermostat settings to be changed less often compared to a shorter time period between when the wireless transceiver is enabled.

Figure 2:
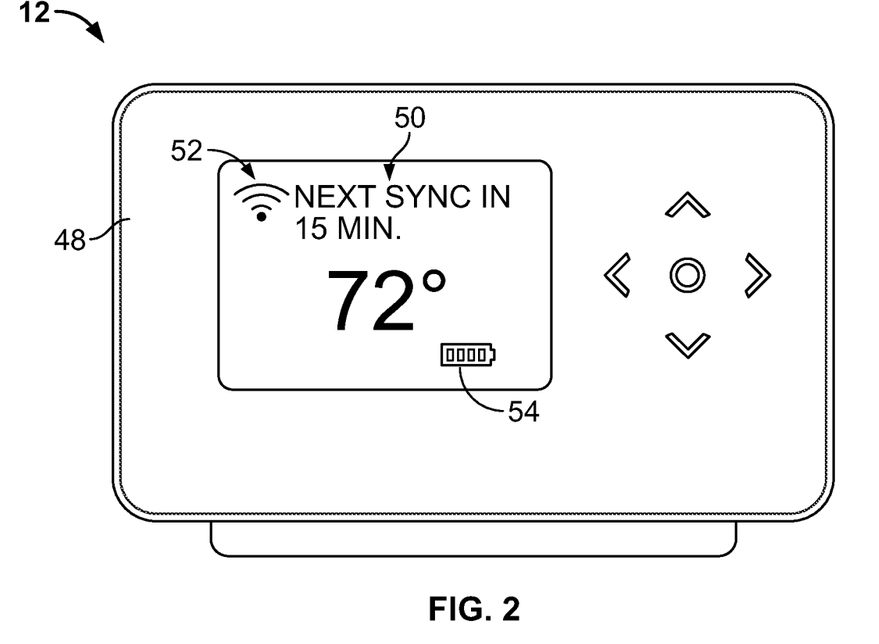
FIGS. 2-9 are example displays of a thermostat in accordance with the present disclosure.
Figure 3:
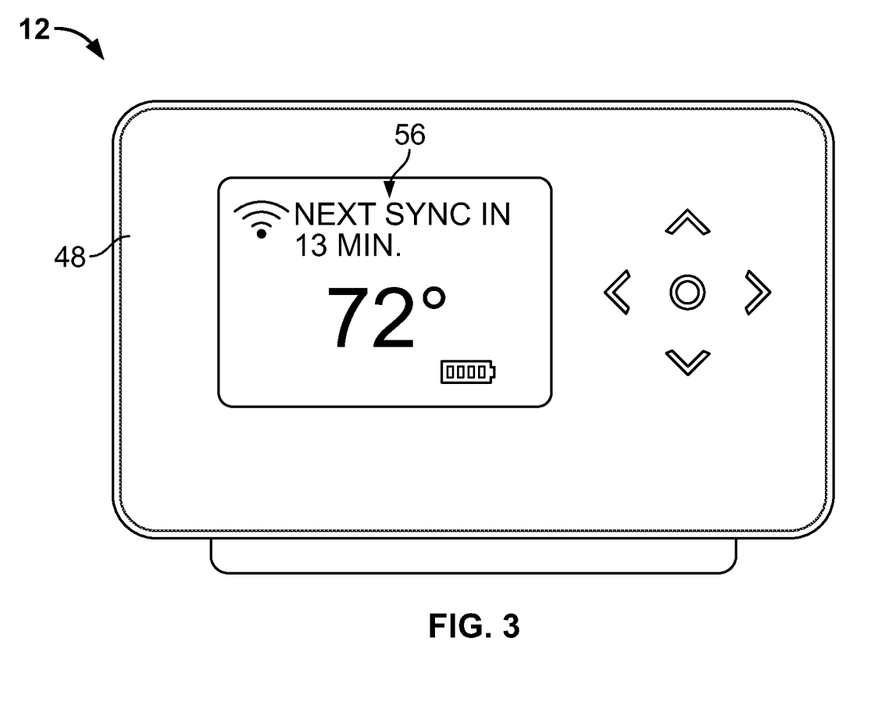
Figure 4:
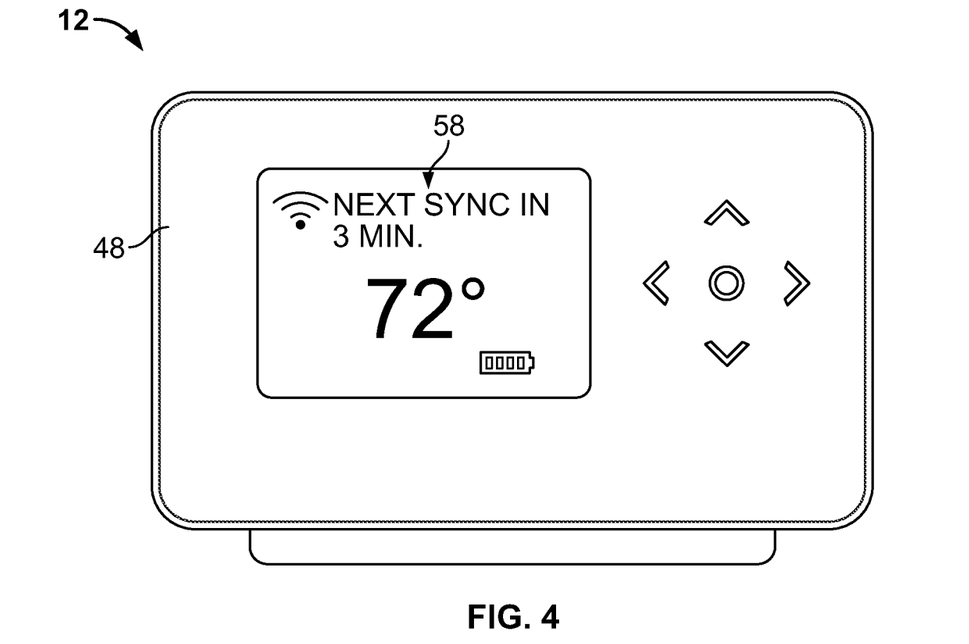
Figure 5:
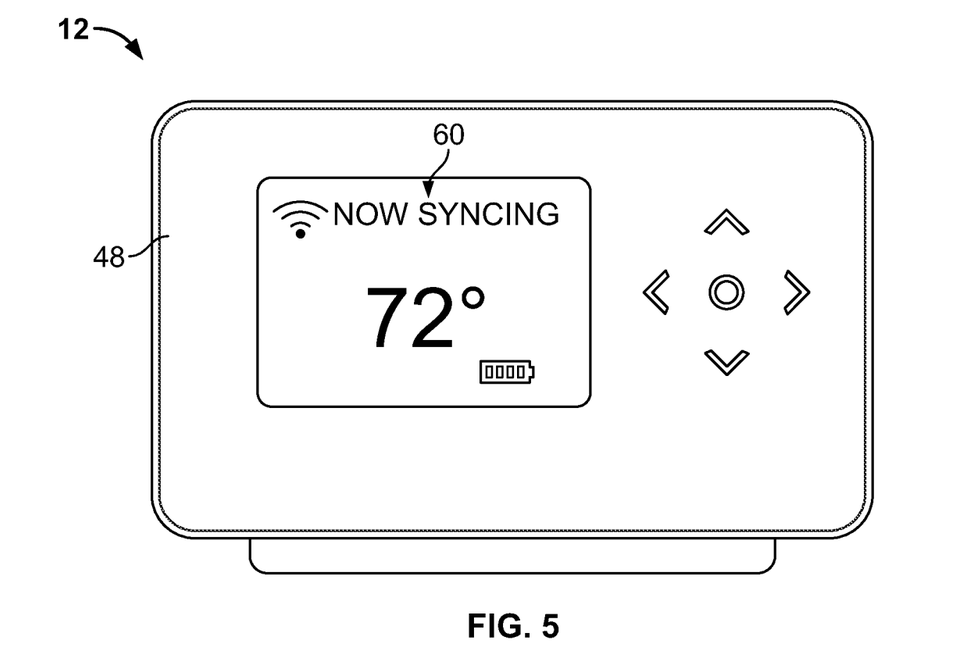
Figure 6:
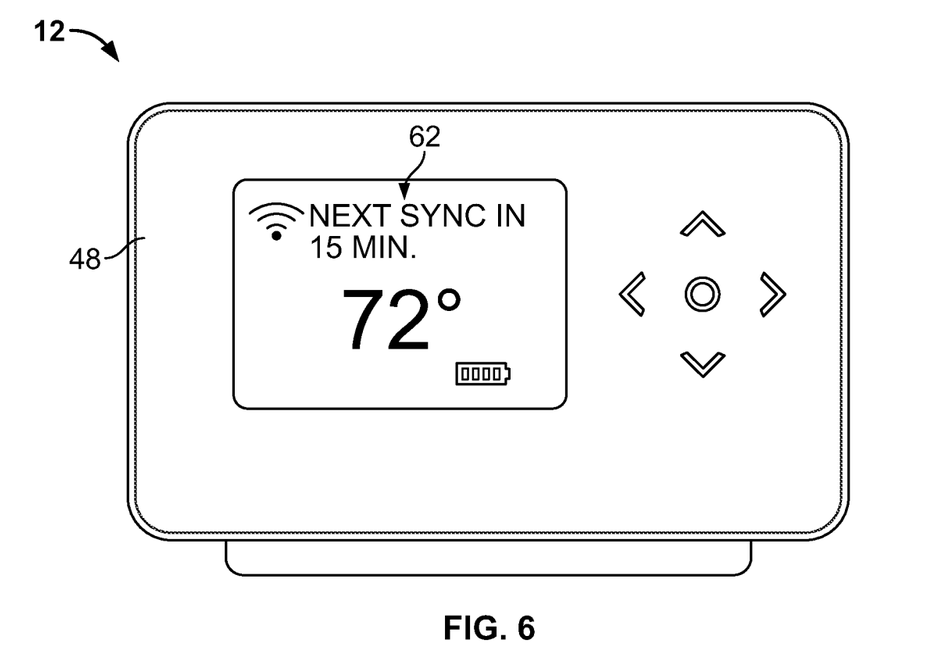

FIG. 2 shows thermostat 12 powered on for the first time or just at the end of a sync cycle. FIG. 3 indicates two minutes have elapsed and 13 minutes remain until the next sync, as shown at 56. FIG. 4 indicates 12 minutes have elapsed and 3 minutes remain until the next sync, as shown at 58. FIG. 5 indicates, at 60, that transceiver 28 is enabled and powered up and is in communication with the remote device or remote server. In this example the phrase "NOW SYNCING" is used, though other phrases or icons could be used. The time period that transceiver 28 is enabled is typically not limited and is determined by the amount of time needed for exchanging information with remote devices and servers. Once the information exchange is completed the transceiver 28 is powered down and the time to the next sync is reset, as shown in FIG. 6 at 62. The time period between when the transceiver is enabled can be displayed in any suitable manner and such as graphical representations rather than the text shown.

Figure 7:
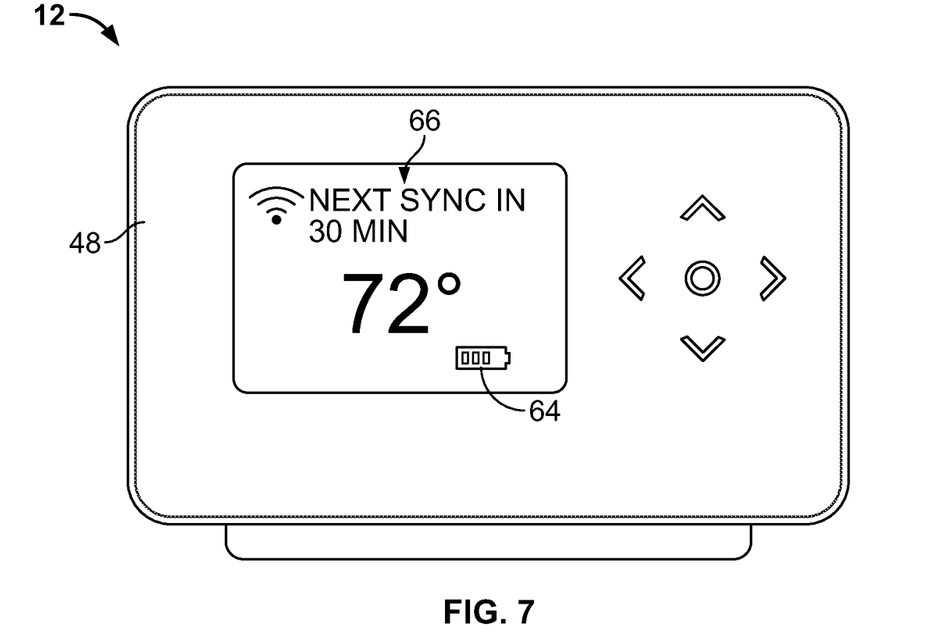
Figure 8:
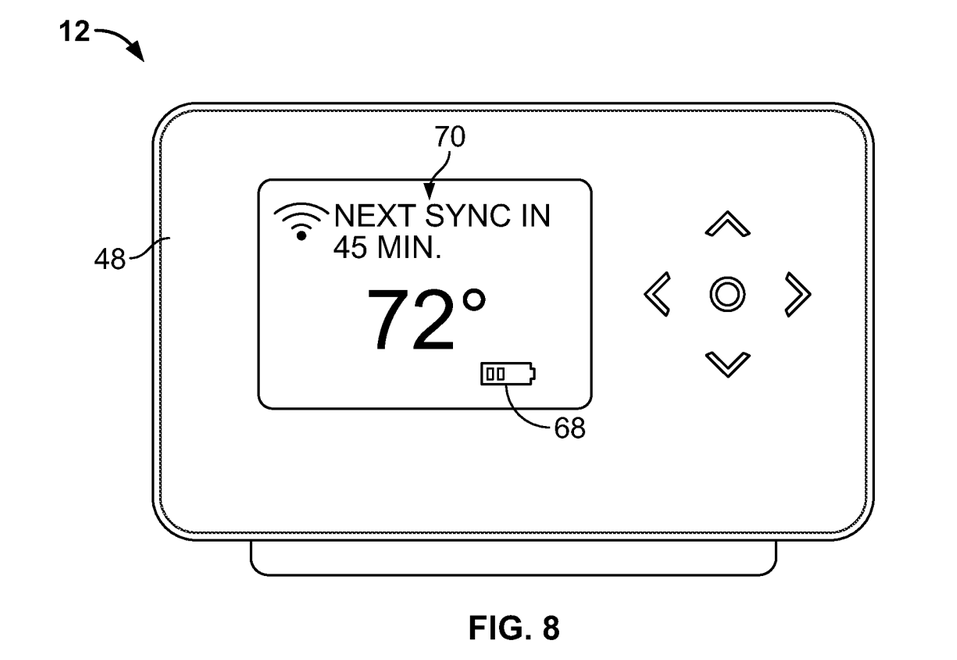

FIGS. 7 and 8 are examples of a thermostat 12 that includes a battery level indicator 38 for determining a remaining power capacity of the battery 30. In this example, the time schedule is changed, e.g., automatically, to increase a time period between when the wireless transceiver 28 is enabled as the remaining power capacity of the battery 30 decreases. FIG. 7, at icon 64, indicates that the battery 30 power capacity has dropped to a predetermined level, such as to 75% of maximum, causing the controller 24 to increase the time to the next sync, when the transceiver will be enabled, from 15 minutes to 30 minutes, as shown at 66. FIG. 8 is an example indicating, at 68, that the battery capacity has fallen even further, such as to 50% of maximum, causing the controller 24 to further increase the time to the next sync to 45 minutes, as shown at 70.

Figure 9:
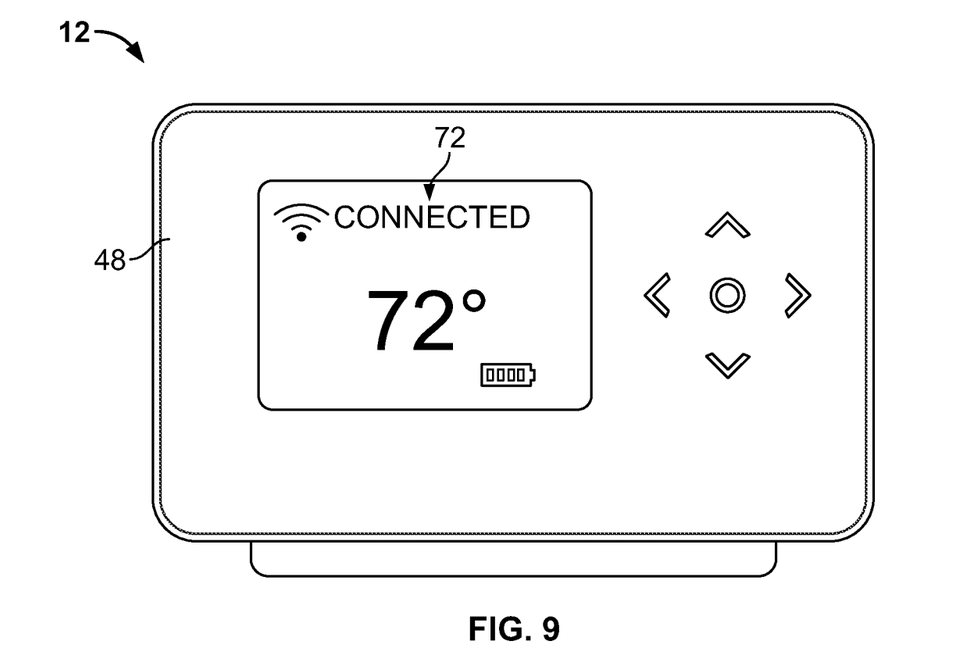

FIG. 9 is an example where the thermostat 12 includes at least one of the common C connection 32 or the power stealing circuit 34 and indicates that the wireless transceiver 28 is enabled by displaying a message such as "CONNECTED", shown at 72.

Figure 10:
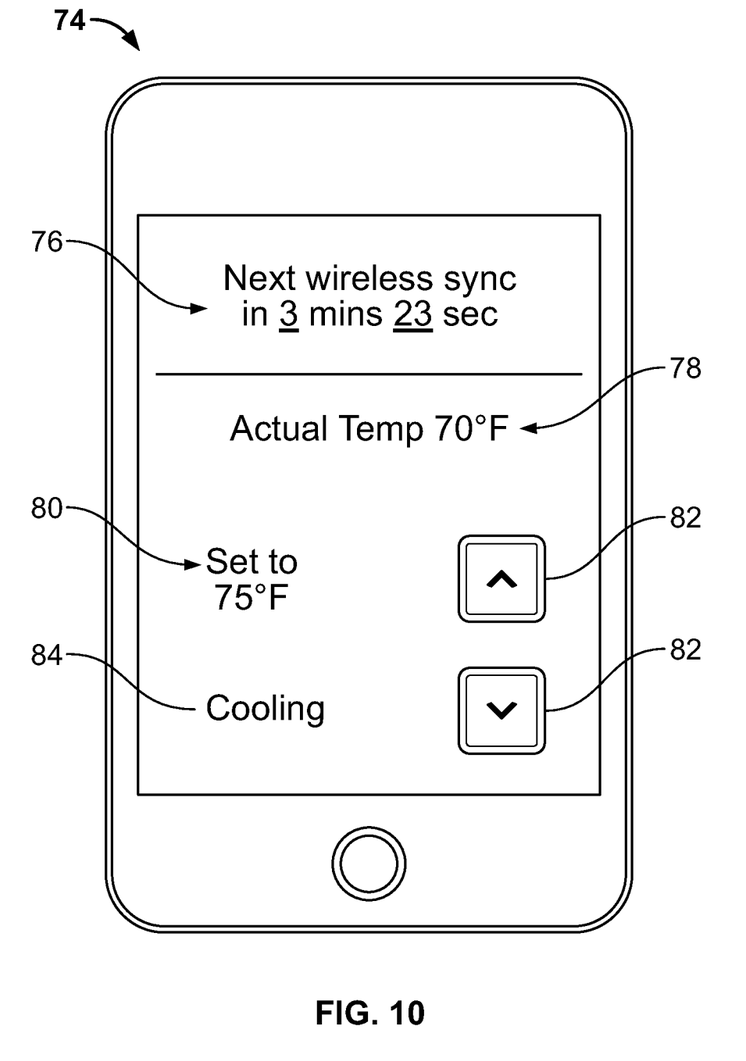
FIG. 10 is an example remote device in accordance with the present disclosure.

FIG. 10 is an example of a remote device 74 including an application for use with the thermostat examples described above. Remote device 74 may be any of a number of different devices such as the smart mobile phone shown, a tablet, a computer, a laptop, a remote control, a server or any other device capable of communicating with the thermostat 12. Thermostat 12 may send the time schedule to a remote server (not shown) via a Wi-Fi connection to the internet and the remote server may then forward the time schedule to remote device 74 or thermostat 12 may send the time schedule directly to the remote device 74. The time schedule may then be displayed on remote device 74 as shown at 76. The thermostat 12 or server may also send information such as the actual temperature sensed by thermostat 12, as shown at 78, and the temperature at which the thermostat 12 is set to turn on the heating or cooling equipment, as shown at 80. The remote device may also include soft buttons 82 for increasing or decreasing the temperature setting shown at 80.

Remote device 74 may also display the mode at which the thermostat 12 is set, such as cooling or heating. The example of FIG. 10, at 84, shows that thermostat mode is set for cooling.

Figure 11:
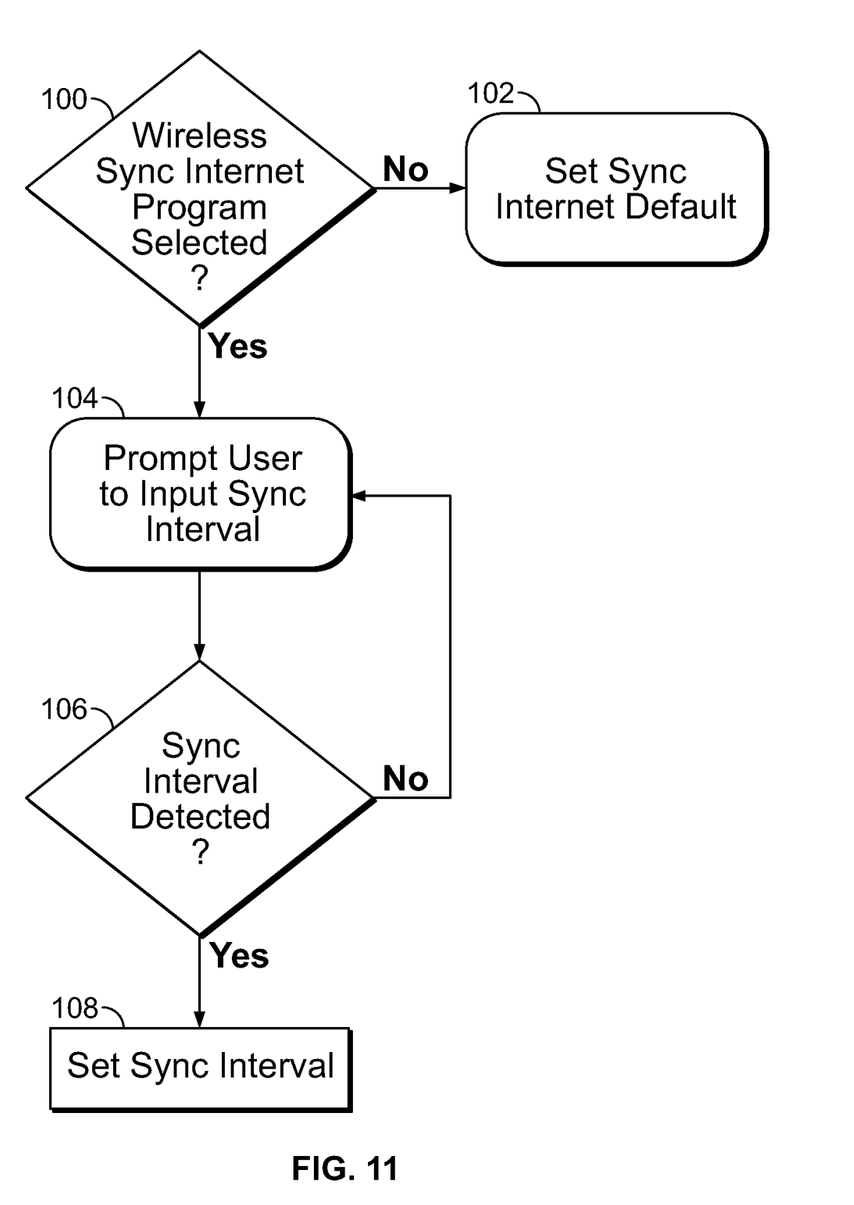
FIG. 11 is a logic flow of an example synch interval setting in accordance with the present disclosure.

FIG. 11 is an example of a logic flow enabling a user, through a device, such as remote device 74, to adjust or program the time schedule for enabling the wireless transceiver 28 (the sync interval time). Step 100 determines if the user has chosen to program the wireless sync interval. If no, step 102 sets the sync interval to the default time schedule, such as the 15 minutes used in the example above. If, at step 100, the user chooses to program the sync interval, step 104 prompts the user to input the sync interval desired. The user may input the sync interval through a numeric keypad displayed or through any other known techniques such as gesture recognition, voice recognition, from a list of possible intervals, or other suitable methods. Step 106 determines if a new sync interval has been detected. If no, the logic loops back to step 104. If yes, step 108 sets the sync interval as detected at step 106.

A logic flow similar to that shown in FIG. 11 could be used to allow a user to program the sync interval increases that may occur as the battery power capacity decreases.

Accordingly, exemplary embodiments are disclosed herein that relate to battery power management in a thermostat with a wireless transceiver, such as by setting a time schedule for enabling the wireless transceiver in a thermostat. By way of example only, the time schedule may be the time between one sync and the next, the time between "now" and the "next data transmission—both ways" events, etc. Also by way of example only, at a given sync event, the devices (e.g., remote interfaces and thermostat) will be "informed" when the next sync event will happen, and will then start counting down and displaying the countdown. In this example, a remote interface user will know when the next sync will happen. Thus, the user will also know when the user's command (e.g., given by the user on a remote user interface) will be executed and when the information displayed on the remote user interface (e.g., current indoor temperature) will reflect the latest real conditions. By default, it will also let the user know that the user's previous command was executed, thus providing expected feedback/confirmation in this example.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermostat comprising:
   a controller configured to control the thermostat;
   a thermostat power source including an internal power source;
   a power supply circuit configured to receive power from the thermostat power source;
   an energy level indicator for determining a remaining power capacity of the internal power source of the thermostat;
   a power supply sensor connected to the controller and configured to sense the thermostat power source; and
   a wireless transceiver connected to the controller, the transceiver configured to receive control information from a remote device for the controller, the transceiver further configured to transmit information from the controller to the remote device;
   wherein the controller is configured to set a time delay greater than zero for enabling the wireless transceiver when the power supply sensor detects that the thermostat power source is the internal power source; and
   wherein the controller is further configured to change the time delay to increase a time period between when the wireless transceiver is enabled as the remaining power capacity of the internal power source decreases.

2. The thermostat of claim 1, wherein the power supply sensor is further configured to determine whether power supplied to the thermostat is from a neutral connector, from power stealing, or from the internal power source.

3. The thermostat of claim 2, wherein the controller is configured to, when power from a neutral connector or power from power stealing is detected, enable the wireless transceiver to continuously receive information from the remote device and transmit information to the remote device.

4. The thermostat of claim 3, wherein the controller is configured to, when power from a neutral connector or power from power stealing is detected, transmit to the remote device that the wireless transceiver is continuously enabled.

5. The thermostat of claim 1, wherein the thermostat power source further comprises a connector configured to connect to one or more power sources external to the thermostat, and wherein the power supply sensor is configured to detect which of the internal power source or the one or more external power sources is providing power to the thermostat.

6. The thermostat of claim 1, configured to transmit an indication of the remaining power capacity of the internal power source to the remote device for display.

7. The thermostat of claim 1, wherein the controller is configured to permit the time delay to be programmed by a user.

8. The thermostat of claim 1, wherein an indication of the time delay is transmitted to the remote device for display.

9. A thermostat comprising:
a controller configured to control the thermostat;
an internal power source configured to supply power for the thermostat and connected to the controller;
a wireless transceiver connected to the controller, the transceiver configured to receive control information from a remote device for the controller, the transceiver further configured to transmit information from the controller to the remote device; and
an energy level indicator configured to determine a remaining power capacity of the internal power source;
wherein the controller is configured to set a time delay for enabling the wireless transceiver; and
wherein the controller is configured to alter the time delay, to increase a time period between when the wireless transceiver is enabled as the remaining power capacity of the internal power source decreases.

10. The thermostat of claim 9, wherein the internal power source comprises a battery.

11. The thermostat of claim 9, wherein the controller is configured to use the transceiver to indicate the remaining power capacity of the internal power source to the remote device.

12. The thermostat of claim 9, wherein the controller is further configured to permit the time delay to be programmed by a user.

13. The thermostat of claim 9, wherein the controller is further configured to transmit an indication of the time delay to the remote device for display.

14. A thermostat system comprising:
a thermostat;
a remote device configured to send control information to the thermostat and configured to receive information;
a controller configured to control the thermostat;
a power source internal to the thermostat and connected to the controller;
a wireless transceiver connected to the controller, the transceiver being configured to receive control information from the remote device for the controller, the transceiver being further configured to transmit information from the controller to the remote device; and
an energy level indicator for determining a remaining power capacity of the internal power source;
wherein the controller is configured to set a time schedule for enabling the wireless transceiver; and
wherein the controller is configured to alter the time schedule by increasing a time period between when the wireless transceiver is enabled as the energy level of the internal power source decreases.

15. The thermostat system of claim 14, wherein the controller is configured to display a current time schedule to a user, the current time schedule having been set in response to a current energy level.

16. The thermostat system of claim 14, wherein the controller is configured to use the transceiver to indicate the remaining energy level of the internal power source to the remote device, and the remote device is configured to display the remaining energy level of the internal power source.

17. The thermostat system of claim 14, wherein the controller and the remote device are further configured to permit the time schedule to be programmed by a user through the remote device.

18. The thermostat system of claim 14, wherein the controller is configured to transmit the time schedule to the remote device through the transceiver, and the remote device is configured to display the time schedule as time remaining to when the wireless transceiver is enabled.

19. The thermostat system of claim 14, wherein the internal power source comprises a battery.

* * * * *